United States Patent [19]

Graham et al.

[11] 3,926,336

[45] Dec. 16, 1975

[54] ESCAPEMENT MECHANISM FOR CASE PACKING MACHINES

[75] Inventors: Robert H. Graham; Duane Sanders, both of Spokane, Wash.

[73] Assignee: R. A. Pearson Company, Spokane, Wash.

[22] Filed: Apr. 5, 1974

[21] Appl. No.: 458,106

[52] U.S. Cl. .................... 221/296; 221/298; 53/61; 198/20 R; 198/22 B
[51] Int. Cl.² ......................................... G07F 11/16
[58] Field of Search ............ 198/26, 20 R, 21, 22 R, 198/22 B, 31 R, 31 AB, 34, 35; 221/10, 13, 14, 251, 296, 298, 299; 53/61, 62, 248; 214/8.5 R, 8.5 K, 8.5 SS

[56] References Cited
UNITED STATES PATENTS

| | | | |
|---|---|---|---|
| 2,142,053 | 12/1938 | Hoban | 221/298 |
| 2,842,912 | 7/1958 | Merkner et al. | 53/61 |
| 3,057,136 | 10/1962 | Walter | 53/248 |
| 3,513,623 | 5/1970 | Pearson | 53/61 |
| 3,555,770 | 1/1971 | Rowekamp | 53/61 |
| 3,570,216 | 3/1971 | Frentzel | 53/61 |
| 3,651,968 | 3/1972 | Cleland | 221/298 |
| 3,672,117 | 6/1972 | Shuttleworth et al. | 53/248 |

*Primary Examiner*—Evon C. Blunk
*Assistant Examiner*—Joseph E. Valenza
*Attorney, Agent, or Firm*—WElls, St. John & Roberts

[57] ABSTRACT

An escapement mechanism for case packing machines of the type wherein a pre-arranged pattern or grouping of uniformly-shaped articles are held within a hopper in upright columns, the articles being gravitationally urged toward a discharge end of the hopper. The escapement mechanism is comprised of first and second abutment surfaces mounted to the hopper for independent movement adjacent the hopper discharge end to alternately allow escape of a prescribed number of articles from the hopper. The first abutment surface is mounted to the hopper for movement to alternately engage and disengage the bottom ends of the articles. The first abutment surface permits discharge of each article from the hopper when moved alternately between the engaged and disengaged positions. The second abutment is positioned in line with the columns of articles and is movable along a path aligned with the columns between two positions. In the first position, the second abutment surface is spaced from the first abutment surface by a distance substantially equivalent to the length of an article within the column. At the second position, the distance is substantially greater than the length of an article. Sensing means is provided in association with the second abutment surface to affect controlled movement of the first and second abutment surfaces to successively discharge the articles from the hopper. In operation, articles are first released from the hopper as the first abutment surface moves to disengage their bottom edges. As the articles are received on the second abutment surface, the sensing means detects their presence and the first abutment surface is moved to engage the bottom surface of the next successive articles. The second abutment surface is then moved to the second position to transfer the articles held thereon into an awaiting transversely movable shuttle carriage of the case packing machine.

6 Claims, 12 Drawing Figures

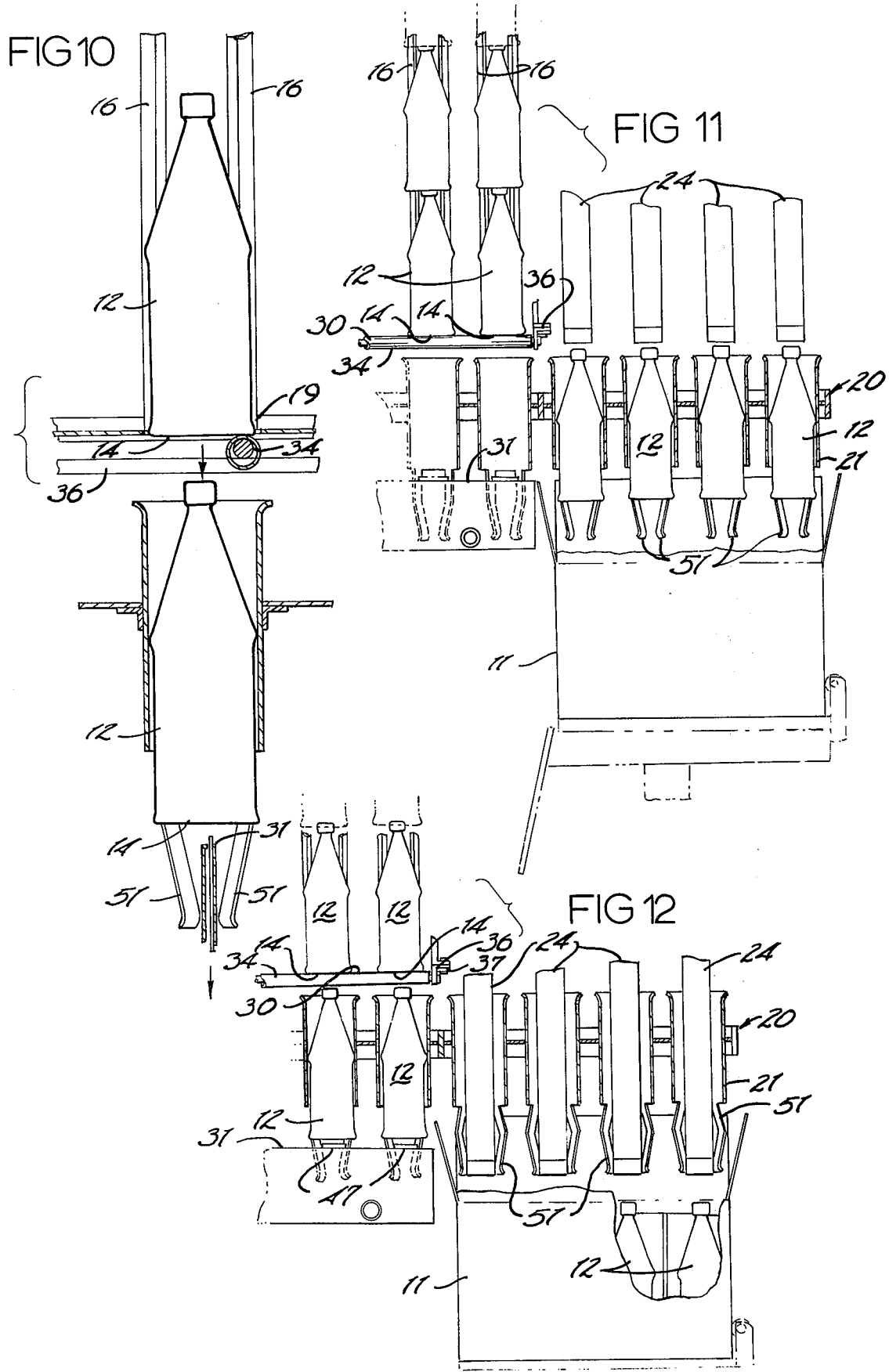

ESCAPEMENT MECHANISM FOR CASE PACKING MACHINES

BACKGROUND OF THE INVENTION

The present invention relates to apparatus for loading predetermined amounts of uniformly sized articles such as bottles, cans, packaged goods and the like into cartons or cases.

Most bottles, cans, and packages are placed in paperboard or cardboard containers for shipping. These cartons are three-dimensional rectangular enclosures which have a top, bottom, two sides and two ends. Most cylindrical articles such as cans and bottles are placed upright in the cartons in one or two layers with or without dividers positioned between the layers. The size, weight and number of the articles generally determine the most economical arrangement and shape of the carton enclosure. Generally, articles are packed in multiples of six with 24 being the most popular size. A carton containing 24 articles is frequently referred to as a case and the carton containing 12 articles is generally referred to as a half case. This terminology is most commonly used in the beverage and canned goods industry. A case of 24 bottles or cans is generally arranged in a single layer of four rows with six bottles or cans in each row. A half-case is generally arranged in three rows with four cans or bottles in each row.

In loading the articles into the cases or cartons, a case packing machine is generally utilized to select prescribed numbers of articles, usually six, 12 or 24, from an oriented group and to automatically place the articles within the cases or containers supplied by a conveyor. Usually, the bottles or cans are forced horizontally into a container having a side opening. Some difficulty has been experienced with such loading in effectively determining proper numbers of bottles or cans to be packed into each individual container. This problem arises from prior sensing and escapement mechanism that, rather than detecting and allowing escape of individual articles, detect rows of articles, and allow escapement of full rows of articles during each cycle. With such a sensing and detecting system, it is possible that an insufficient number of articles may be packed into cartons and the missing article may not be detected by the sensing means.

The apparatus of the present invention discloses an escapement mechanism for case packing machines that insures accurate placement of prescribed numbers of articles within each carton supplied by a horizontal feed conveyor. The articles are held in a pattern or grouping of upright columns within a hopper. The hopper includes a discharge end at a lower end, toward which the articles are urged by gravity. The escapement mechanism is located adjacent the discharge end of the hopper. It operates in response to operation of the case packing machine to accept a prescribed number of articles to be vertically packed into the cases below during each operational cycle.

SUMMARY OF THE INVENTION

An escapement mechanism is described for case packing machines of the type wherein a pre-selected pattern or grouping of uniformly shaped articles, each including a reduced upper end and an enlarged bottom end, are stacked in an elongated column. A plurality of such columns are arranged parallel to one another in the desired pattern within a hopper and are urged gravitationally toward a lower discharge end. The escapement mechanism comprises a first abutment surface mounted to the hopper immediately adjacent the discharge end. The first abutment surface is alternately movable transverse to the column to engage and disengage the bottom surfaces of the articles. This successively permits each article to be dropped or dischared from the hopper when the first abutment surface is disengaged from its bottom surface. It also prevents escape of the articles from the hopper when engaged with the article bottom surface. The escapement mechanism also includes a second movable abutment surface that is spaced below the first abutment surface and aligned along each column. The second abutment surface is movable between a first position where the distance between the first and second abutment surfaces is equivalent to the distance between the top and bottom surfaces of a single article in the nested column and a second position wherein the distance between the abutment surfaces is greater than the distance between the top and bottom surfaces of an article. Movement of the second abutment surface is accomplished through means operated in coordination with operation of the case packing machine.

It is a first object of the present invention to provide an article escapement mechanism that will effectively release a prescribed pattern of articles in a layer from upright columns and will assure reception of the prescribed number of articles for further case packing operations.

It is a further object of the present invention to provide such a mechanism that provides means for detecting accurately whether the prescribed number of articles has been released from the hopper through operation of the escapement mechanism.

It is a yet further object to provide such a mechanism that is very simple in construction and thereby relatively maintenance-free.

These and further objects and advantages will become apparent upon reading the following detailed description which, taken with the accompanying drawings, disclose a preferred form of the present invention.

A BRIEF DESCRIPTION OF THE DRAWINGS

A preferred form of the present invention is illustrated in the accompanying drawings in which:

FIGS. 7–12 are diagrammatic operational views illustrating operation of the present invention in conjunction with operation of the illustrated case packing machine.

DETAILED DESCRIPTION OF A PREFERRED EMBODIMENT

Figure 5:
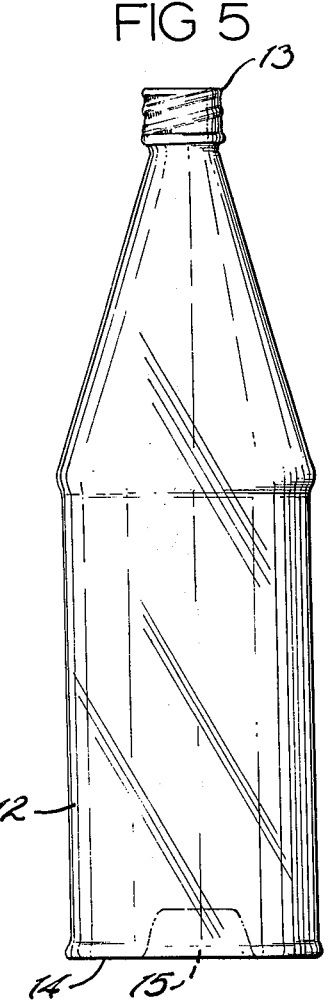
FIG. 5 is a pictorial view of an article showing a bottle serving as an example of an article that may be effectively handled by the present invention.
Figure 7:
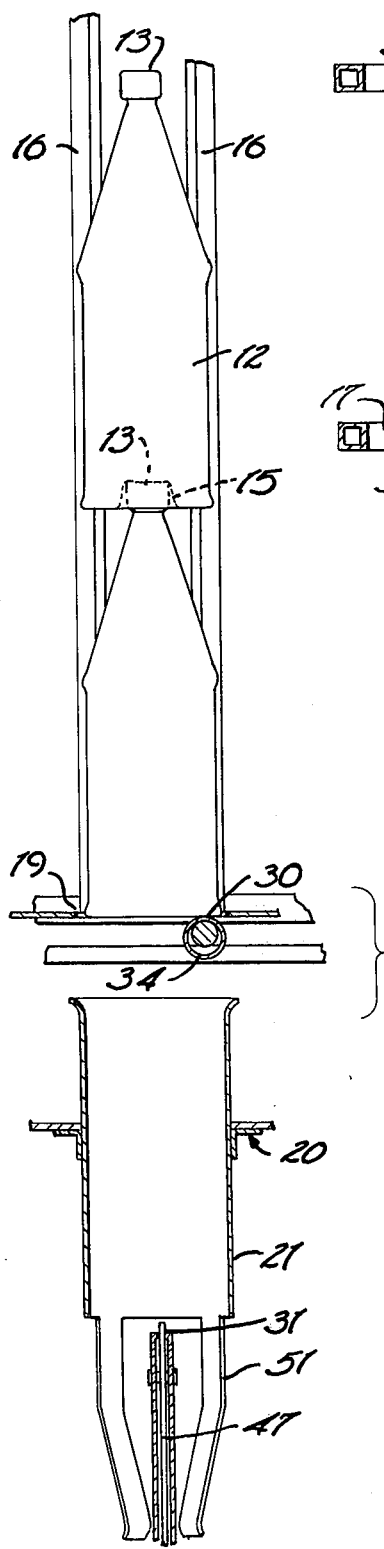

The apparatus of the present invention is illustrated in the accompanying drawings in conjunction with a case packer generally designated by the reference numeral 10. The case packer 10 positions individual empty cases or cartons 11 on a conveyor 18 and fills the cases or cartons with articles 12. A typical article 12 is illustrated in FIG. 5 as a bottle having a reduced upper end 13 and an enlarged bottom end 14. The illustrated bottle 12 has a bottom recess 15 into which the reduced upper end of another bottle may be received (FIG. 7). Bottles 12 nest into one another and may be stacked as shown, in a plurality of columns with the reduced upper end of one bottle nested within the recess 15 of an upwardly adjacent bottle. The bottle columns are arranged in a prescribed pattern or grouping leading to a hopper 17 of the case packing machine 10.

Figure 1:
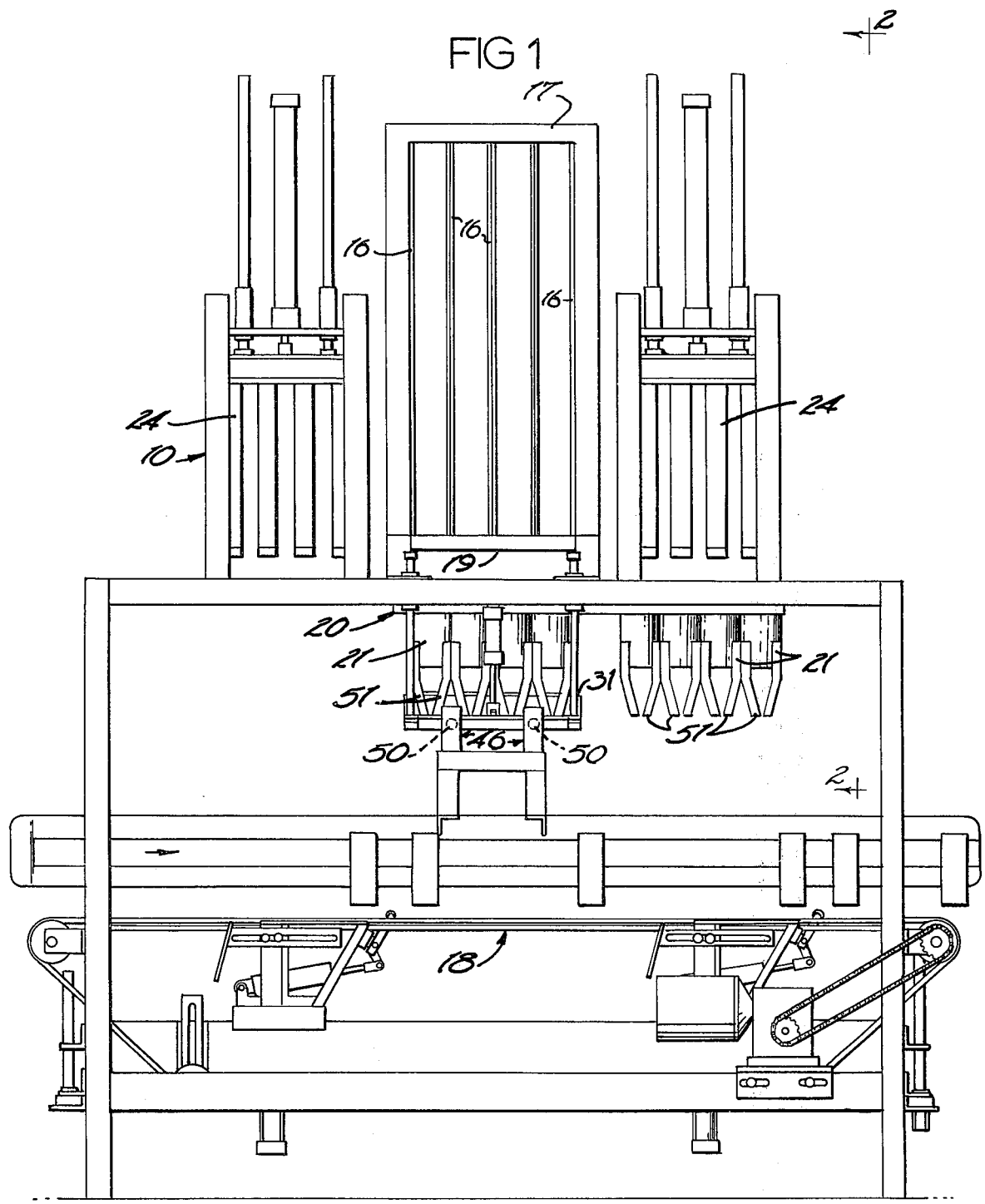
FIG. 1 is a front elevational view of a case packer embodying the escapement mechanism of the present invention.

As shown in FIG. 1, hopper 17 is upright. Each column of bottles (see FIG. 7) is guided between four upright rods 16, which lead upwardly to bottle conveyors, such as pneumatic tubes (not shown). The bottles are fed into the hopper in an upright, end-to-end relationship within the column. They nest into one another as they are stopped at the lower end of the hopper and form an intermittently movable stack. Movement of the bottles within the confines of rods 16 is gravitational, the frictional resistance offered by rods 16 being negligible.

The columns of bottles are arranged in hopper 17 to conform in cross section to the pattern the bottles must assume when packed within containers 11.

The control escapement is located adjacent the discharge end 19 at the bottom of hopper 17. It is utilized to successively supply a prescribed number of bottles to a shuttle carriage 20 of the packing machine 10. The shuttle carriage 20 is horizontally oriented on the packing machine framework. It moves or reciprocates parallel to the paths of cartons 11 along conveyor 18.

Figure 4:
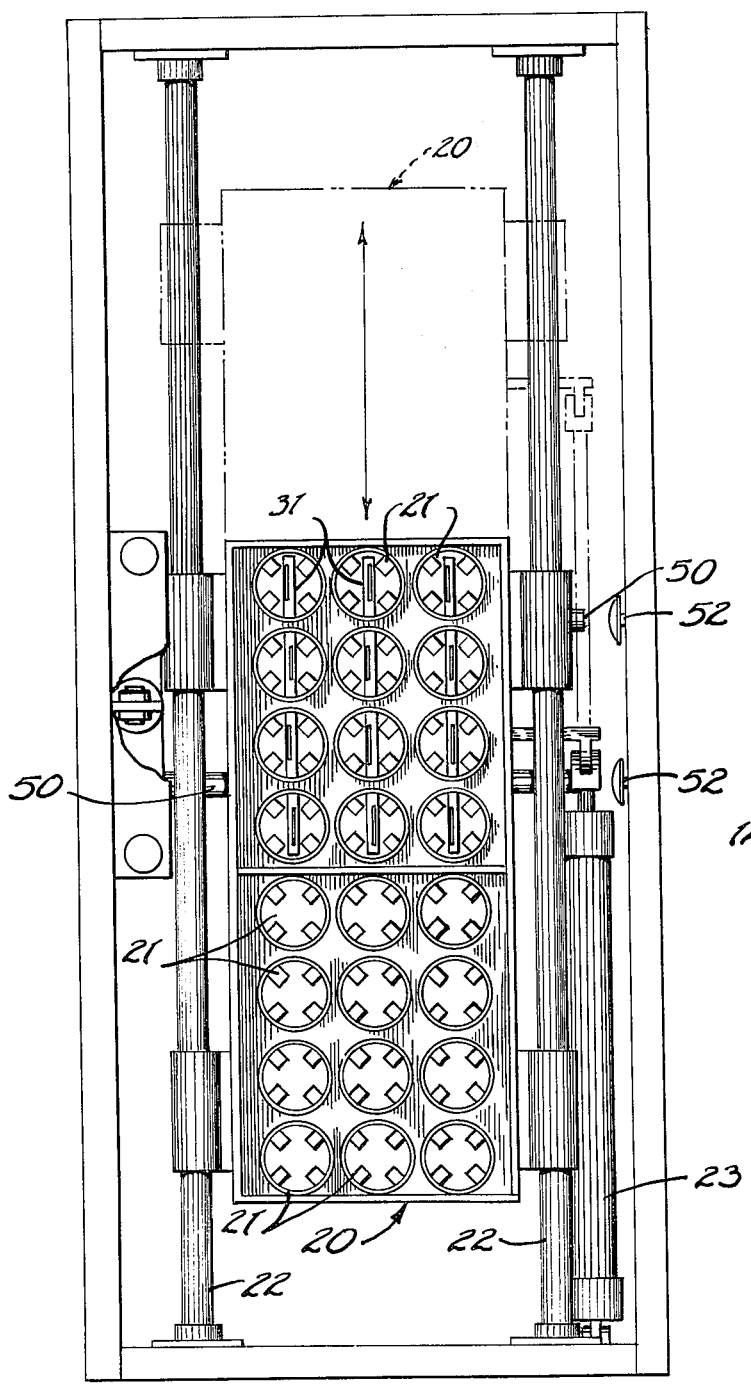
FIG. 4 is a plan section view taken substantially along 4—4 in FIG. 2.

Shuttle carriage 20 is illustrated in FIGS. 1 and 4. It includes a plurality of bottle-receiving chutes 21. Chutes 21 are arranged in two groups of twelve chutes each (FIG. 4) for loading "half-cases" of bottles. The shuttle carriage 20 is reciprocated along slide bars 22 by means of a cylinder 23 mounted between it and the case packer framework. Alternate positions of shuttle carriage 20 are illustrated in FIG. 4 by solid and phantom lines.

The groups of chutes 21 are arranged on the shuttle carriage so that at either of its positions, one group or the other is aligned beneath the discharge end 19 of hopper 17. The remaining group of chutes 21 is positioned elevationally above an article loading station where a vertically movable ram 24 pushes a group of bottles from within the filled chutes through the chutes 21 and into a waiting container or case.

It may be noted in FIG. 1 that two rams 24 are utilized. By providing this arrangement, the shuttle carriage 20 may be loaded with bottles during the same operating interval that bottles are being discharged into a container. Each group of chutes 21 successively receives a group of bottles 12 and is emptied as the shuttle carriage 20 is reciprocated back and forth under the hopper 17 and rams 24.

An analogous arrangement of a loading shuttle is described for end loading cartons in U.S. Pat. No. 3,513,623 granted to Reinhold A. Pearson on May 26, 1970.

The escapement mechanism is situated on the case packing machine 10 adjacent the hopper discharge end 19. The relative position of the escapement mechanism may best be seen in FIGS. 1 and 2. The escapement mechanism comprises a first abutment surface 30 mounted to the hopper 17 immediately adjacent hopper discharge end 19. It is coplanar with the lower bottle surfaces in hopper 17. The escapement mechanism further includes a second abutment surface 31 that is located elevationally below the first abutment surface 30. A drive means 32 (FIG. 6) is provided to operate the first abutment surface to selectively move it back and forth in a reciprocating path in response to operation of the packing machine. Likewise the second abutment surface is operatively connected to drive means 33 that moves surface 31 vertically relative to the first abutment surface 30.

Figure 2:
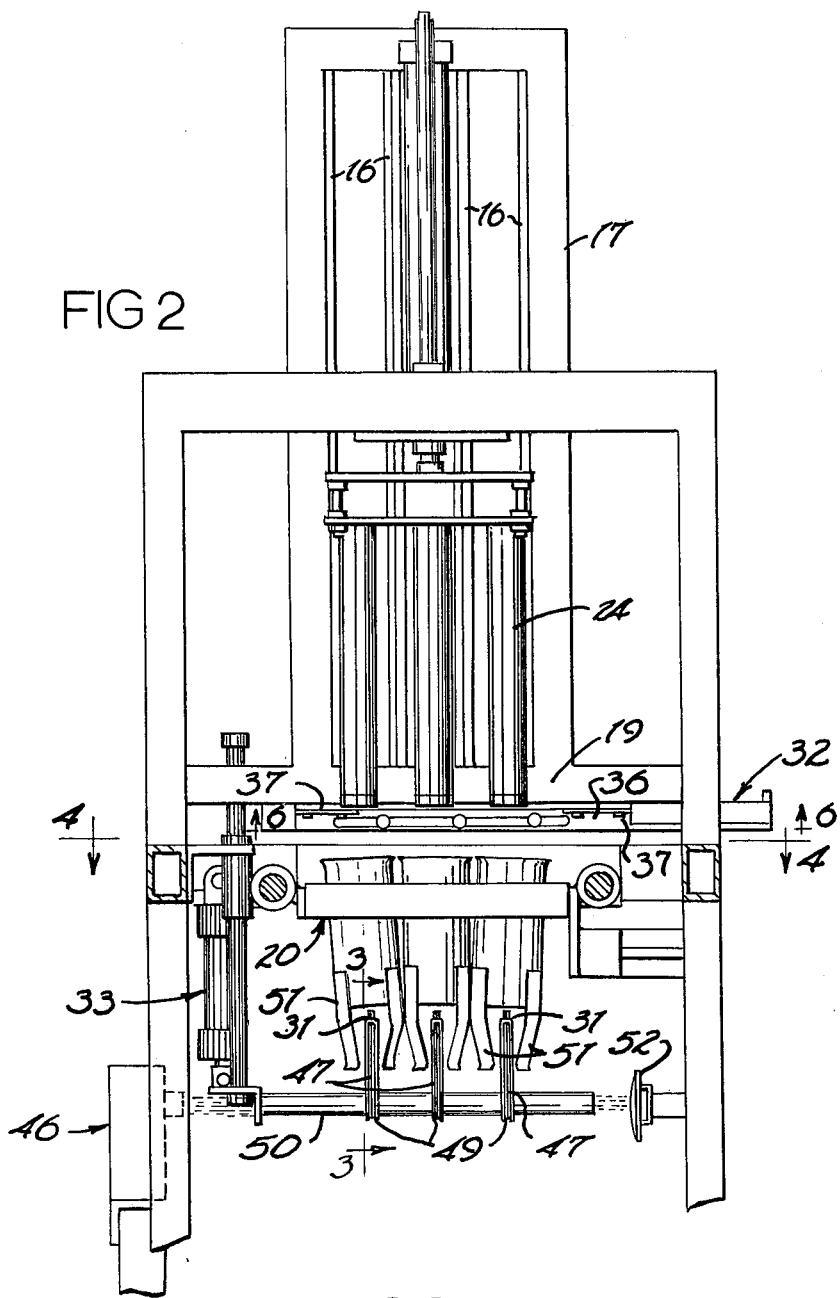
FIG. 2 is a fragmentary end view of the case packing machine taken along line 2—2 in FIG. 1.
Figure 6:
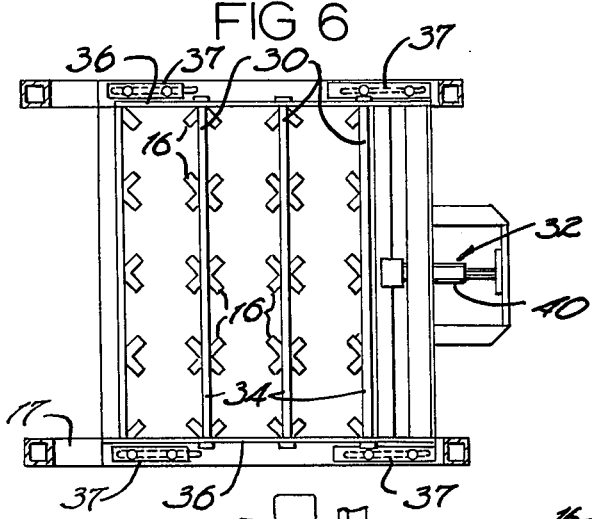
FIG. 6 is a sectioned view taken substantially along line 6—6 in FIG. 2 illustrating the escapement mechanism of the present invention.
Figure 8:
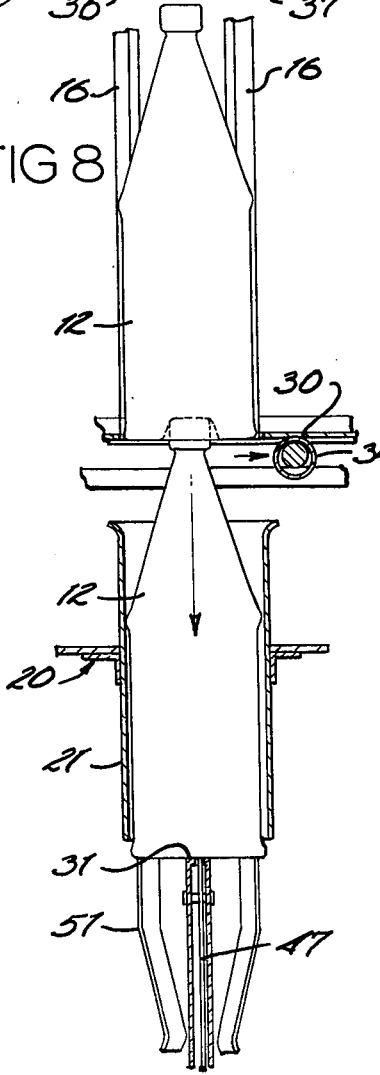

First abutment surface 30 is illustrated in substantial detail in FIGS. 2 and 6. Abutment surface 30 is shown therein comprising a plurality of transversely spaced, elongated bars 34 that extend across the hopper discharge 19. The bars 34 are adjustably fixed within horizontal slots of opposed frame members 36. Members 36 are slidably supported by opposed slide plates 37 mounted to the hopper framework. Slide plates 37 define a horizontal path of travel for the members 36 and bars 34 that is transverse and substantially perpendicular to the upright columns of bottles in hopper 17. The three bars 34 move in unison between a position in the paths of bottles 12 (FIGS. 7, 9, 10) and a position clear of them (FIGS. 2, 6, 8).

Drive means 32 is comprised of a cylinder 40 interposed between the framework of the case packing machine and the members 36. Cylinder 40 is selectively operated to move bars 34 to intersect the columns of bottles across the bottom of hopper 17 and to engage the enlarged lower ends 14 of bottles 12 to prevent their further downward movement (FIG. 7). Cylinder 40 is also operable to position bars 34 clear of the bottles (FIG. 8) so they can drop gravitationally toward the second abutment surface 21.

Cylinder 40 is operated in response to signals supplied by internal limit switches within the shuttle cylinder 23 operable when the shuttle carriage 20 is located at either of its alternate extreme positions. Once the shuttle carriage 20 is in either of these positions, a group of empty chutes 21 are positioned below the hopper discharge 19. Cylinder 40 is then operated to move bars 34 to clear the columns of bottles 12. This movement allows a fresh group of bottles 12 to be deposited into the awaiting empty chutes 21. This operation is progressively illustrated by FIGS. 7 and 8 respectively.

Figure 9:
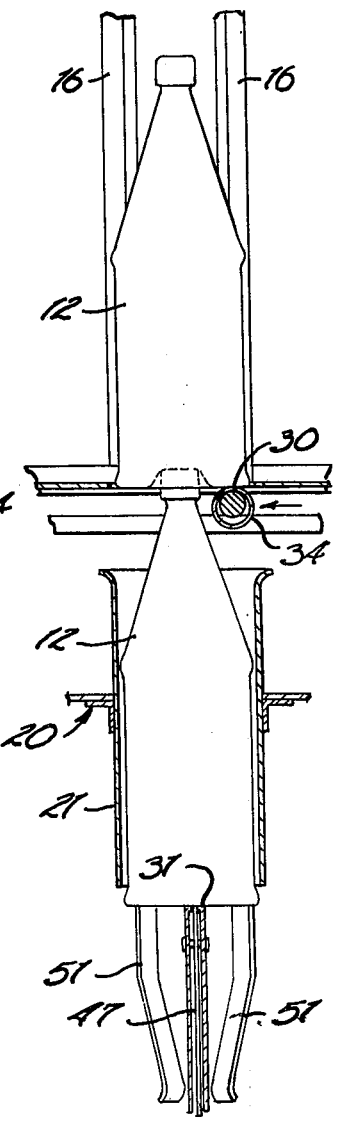

Second abutment surface 31 is located elevationally below the first abutment surface 30. The initial spacing between the surface 30 and surface 31 is substantially equal to the effective height of a single bottle 12 in the columns within hopper 17. This "effective height" may be equal to the actual bottle height (if the bottles are not nested) or may be less than the actual bottle height (the distance between the enlarged lower ends 14 of adjacent bottles 12 if nested as illustrated herein). The resulting elevational location of the articles received within chutes 21 is such that the bottom enlarged ends 14 of the next group of bottles are coplanar with the first abutment surfaces 30. By holding the columns in such a position, abutment surface 31 enables movement of the first abutment surface 30 back under the bottle columns (FIG. 8) to again engage the lower ends 14 of the next pattern or group of bottles 12 (FIG. 9). The weight of the columns of bottles is thereby transferred to the first abutment surface and the group of bottles within the chutes 21 are supported on the second abutment surface 31.

Drive menas 33 is illustrated in FIGS. 1 and 2 for vertically moving abutment surface 31 between its initial elevated position and a vertically-spaced lowered position (FIG. 10). This movement enables the group of bottles 12 to be completely disengaged from contact with the upwardly-adjacent bottles. Such movement also shifts or transfers the weight of the deposited articles to chutes 21. As shown in FIG. 10, the second abutment surface 31 is spaced clear of bottles 12, after being moved to the lowered position.

Chutes 21 include spring fingers 51 thereon that are bent inwardly to encompass a diameter substantially smaller than the cross-sectional diameter of the articles. The weight of the articles is thereby transferred to the spring fingers as abutment surface 31 is lowered. This movement enables the balance arms 47 to return to their normal conditions prior to receiving the next successive group of articles from hopper 17.

Figure 3:
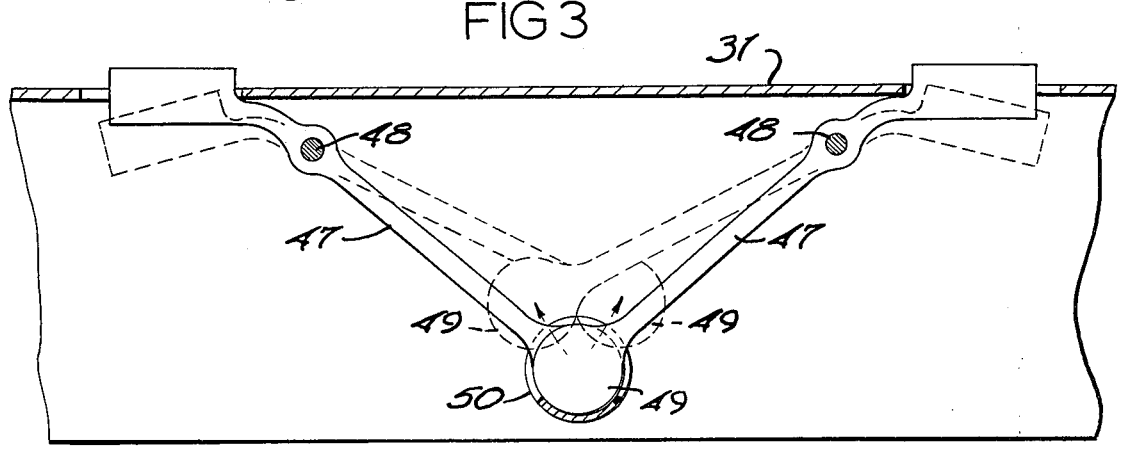
FIG. 3 is a sectioned view taken substantially along line 3—3 in FIG. 2, illustrating the sensing means of the present invention.

The second abutment surface 31 is provided with a sensing means 46 that detects the presence of the prescribed number of bottles to be deposited into cartons 11. In this arrangement, a balance arm 47 (FIG. 3) is provided for each bottle received on the abutment surface 31. The arms 47 are pivotally mounted at 48. The weight of a bottle 12 pivots the lower end 49 of each arm 47 to a position as illustrated by dashed lines in FIG. 3. Arm ends 49 are normally situated along a pair of transverse tubes 50. Transverse slots across each tube receive the movable arm ends 49. As the abutment surface 31 receives the prescribed number of articles, all the lower arm ends 49 are pivoted upwardly to clear tubes 50.

A pair of cells 51 is provided adjacent the ends of tubes 50 with a pair of reflectors 52 adjacent the remaining tube ends. Light from the photo cells cannot pass through tubes 50 unless the lower arm ends 49 are all pivoted clear of the tubes. Since a balance arm 47 is provided at each location designed to receive a bottle on surface 31, operation of the packing machinery may be selectively inhibited even if a single article is not in place on the second abutment surface. This provision guarantees that each container 11 will receive a complete group or pattern of articles.

Operation of the present invention in conjunction with operation of the illustrated case packer may now be understood with reference to FIGS. 7-12. It may be noted, although only one column of bottles 12 is illustrated. Similarly, only one bar 34 and abutment surface 31 is shown. In a typical arrangement a plurality of columns are handled simultaneously by a plurality of bars 34 and abutment surfaces 31 as illustrated in FIG. 2 and 6.

An arbitrary starting position is assumed as graphically illustrated in FIG. 7 wherein a group of empty chutes 21 are located below the hopper discharge 19, and wherein the second abutment surface 32 has previously been moved to the upper position. As the shuttle carriage 20 reaches such position, the limit switch located within cylinder 23 actuates drive means 32 to retract bars 34 to the position illustrated in FIG. 8. This movement enables the articles to drop an increment (substantially the length of a single nested bottle) determined by the elevational location of the second abutment surface 31 (FIG. 8). Sensing means 46 determines that each chute 21 has received a bottle. When this condition is met, the first abutment surface is operated by drive means 32 to move back into contact with the next successive article and thereby provide support for the remainder of the article columns.

The second abutment surface 31 is then operated by drive means 33 to move to the lowered position as illustrated in FIG. 10. This enables transfer of the articles previously held on surface 31 to the chutes 21.

Once shuttle carriage 20 receives a group of articles from hopper 17, it is activated to shift toward one of the two bottle discharge rams 24. The remaining, empty set of chutes 21 is thereby brought into alignment with the hopper discharge 19 to enable the chute loading process to be repeated.

The carton or case loading operation is illustrated basically in FIGS. 11 and 12. As shown in FIG. 11, shuttle carriage 20 has been shifted to a position immediately above a case 11. This position locates the bottles held within the chutes 21, the bottle discharge ram 24, and the open side of a case 11 in alignment. At this position, the ram 24 is operated to engage the upper ends 13 of the bottles held within chutes 21 to push them downwardly through the spring fingers 53 and into the waiting container. The escapement mechanism is operated to simultaneously load the chutes 21 as the previously loaded articles 12 are deposited into a case (FIGS. 11, 12).

As a full load of bottles are being received within the chutes 21 below hopper 17, the bottles held within the adjacent group of chutes 21 are deposited into a container. Carriage 20 is then operated to shift the loaded chutes to a position below the remaining discharge ram 24 and the escapement mechanism again operates as that ram pushes the articles through the chutes 21 and into a container positioned below.

It may be understood that this is a continuous operation and will operate automatically so long as sufficient articles are held within hopper 17 and a sufficient supply of cases 11 are available on case conveyor 18.

While reference has been made specifically to nested bottles, other bottle shapes, cans, and articles can also be packed and handled in like manner. The apparatus is not to be limited to handling of any specific article shape or structure. Whether the bottle or article is full or empty is also immaterial to the disclosure.

It may have become evident upon reading the above description in view of the attached drawings that various changes and modifications may be made therein without departing from the scope of the present invention. It is therefore intended that only the following claims be taken as definitions of this invention.

What is claimed is:

1. An escapement mechanism for handling articles of equal height in successive groups wherein the articles each include a reduced end and an enlarged end, and are initially stacked vertically one against another with the reduced end of one article engaged against the enlarged end of an adjacent article to form a plurality of elongated columns, the effective height of each article in the columns being equal, said columns being arranged parallel to each other and in a rectangular array to form rectangular groups of articles within a hopper and being urged toward a hopper discharge end, said escapement mechanism comprising:

first abutment means mounted to the hopper for movement between a first position intersecting the article columns and engaging the enlarged end of each article in a rectangular group along a plane located across the hopper discharge end and a second position laterally clear of the article columns, for intermittently permitting single groups of articles to move outward from the hopper discharge end;

first drive means operatively connected to said first abutment means for moving said first abutment means between said first and second positions;

second abutment means in line with said columns and spaced outwardly from the hopper discharge end for receiving and supporting the rectangular groups of articles released by said first abutment means along their enlarged ends and for vertically moving the groups engaged thereby between (a) a first position in line with and intersecting the respective columns wherein said enlarged ends are spaced outwardly from said plane by a distance substantially equal to the effective height of a single article in a column and (b) a second position in line with and intersecting the respective columns wherein the enlarged ends are spaced outward from the plane by a distance greater than the actual height of a single article;

second drive means operatively connected to said second abutment means for moving said second abutment to move successive groups of articles from the first to the second position;

sensing means for detecting engagement of a prescribed number of articles on said second abutment means and operatively communicating with said first drive means to affect movement of the first abutment means upon sensing engagement of a prescribed number of articles on said second abutment means; and transfer means for moving the groups of articles while they are supported by the second abutment means at the second position along a path to a location laterally clear of the elongated columns.

2. The escapement mechanism set out in claim 1 wherein the rectangular groups of articles are arranged in ranks and files of articles and wherein said second abutment means is comprised of a narrow channel member extending along the length of each file of articles and intersecting the columns, said channel members being commonly connected to said second drive means for movement in unison and in response to said second drive means for movement in unison and in response to said second drive means; and wherein said transfer means is comprised of a shuttle carriage having a number of open article receiving chute means therein equal in number to the number of articles in a single rectangular group, each for receiving an article from said hopper;

intermediate abutment means on each chute located outwardly from said hopper between said first and second positions for engaging articles held on the second abutment means as said second abutment is moved toward said second position and for supporting said articles within said chutes while moving to said location.

3. The escapement mechanism set out in claim 1 wherein the rectangular groups of articles are comprised of aligned ranks and files of articles and wherein said first abutment means is comprised of a rod for each file oriented perpendicularly to the columns and reciprocably movable along said plane.

4. The escapement mechanism set out in claim 1 wherein the sensing means is comprised of:

detector means adjacent the second abutment for detecting presence of an obstruction across a prescribed area; and a balance arm for each article received on the second abutment; mounted for free pivotal movement thereon and having one end for receiving an article and a remaining end spaced from the one end in order that when an article is received on said one end, the remaining end is pivoted from a first normal position obstructing said prescribed area, to a second position clear of said prescribed area, whereby said detector means is enabled to accurately sense when said prescribed number of articles are supported on said second abutment means.

5. The escapement mechanism set out in claim 1 wherein the rectangular groups of articles are comprised of ranks and files of articles and wherein said second abutment means is comprised of a narrow channel member extending along the length of each file of articles and intersecting the columns, said channel members being commonly connected to said second drive means for movement in unison and in response to said second drive means.

6. The escapement mechanism set out in claim 1 wherein the rectangular groups of articles are arranged in ranks and files of articles and wherein said second abutment means is comprised of a narrow channel member extending along the length of each file of articles and intersecting the columns, said channel members being commonly connected to said second drive means for movement in unison and in response to said second drive means;

and wherein said path is substantially parallel to the files of articles.

* * * * *